United States Patent [19]

Kirner

[11] 3,996,151

[45] Dec. 7, 1976

[54] ALKALINE PEROXIDE BLEACH LIQUOR

[75] Inventor: Uwe Kirner, Bobenheim-Roxheim, Germany

[73] Assignee: BASF Aktiengesellschaft, Ludwigshafen (Rhine), Germany

[22] Filed: Jan. 26, 1976

[21] Appl. No.: 652,388

[30] Foreign Application Priority Data

Feb. 18, 1975 Germany .......................... 2506799

[52] U.S. Cl. ................................. 252/186; 8/111; 252/99; 252/102
[51] Int. Cl.² ......................................... C01B 15/02
[58] Field of Search ................... 252/186, 99, 102; 8/111; 423/272, 273

[56] References Cited

UNITED STATES PATENTS

| | | | |
|---|---|---|---|
| 3,749,673 | 7/1973 | Jones et al. | 8/111 |
| 3,766,078 | 10/1973 | Kowalski | 252/99 |
| 3,811,833 | 5/1974 | Stalter | 252/99 |
| 3,836,475 | 9/1974 | Kirner | 252/186 |
| 3,860,391 | 1/1975 | Kling et al. | 252/186 |

Primary Examiner—Benjamin R. Padgett
Assistant Examiner—Deborah L. Kyle
Attorney, Agent, or Firm—Johnston, Keil, Thompson & Shurtleff

[57] ABSTRACT

Concentrated aqueous/alkaline peroxide bleach liquor containing (a) silicate and (b) peroxide stabilizers having a content of alkaline earth metal are stabilized against precipitation of alkaline earth silicates.

2 Claims, No Drawings

ALKALINE PEROXIDE BLEACH LIQUOR

This invention relates to the stabilization of aqueous-/alkaline peroxide bleach liquors against precipitation.

In the pretreatment of cellulosic fibrous materials it is not usual to dry the material between the individual operations, that is to say the material is given an intermediate wash and is then merely squeezed, for example in a padding machine, before being passed to the next treatment bath. Such wet-in-wet impregnation, however, generally causes an increase in the concentration of the impregnating liquor by a factor of from 4 to 6 and in automatic metering units of up to 10, depending on the degree of squeezing effected in the previous operation.

The concentrations which occur in an alkaline peroxide bath, if a short liquor is being used and particularly when impregnation is being carried out in the aforementioned wet-in-wet method, are so high that there results considerable instability as regards the inorganic cations dissolved in the liquors, particularly alkaline earth metal ions usually present in the peroxide stabilizers commonly used and possibly present on account of the hard water usually employed. The concentration of sodium silicate and peroxide stabilizers in such baths may be so high that, on account of the very high pH of the bath, precipitation of alkaline earth metal silicates may be observed in a short time (about 30 min.). Such separated material collects on the padding rolls and, particularly in pad-batch processes, on the treated fabric, which may be very troublesome and frequently leads to fibrous material having a hard handle. Finally, such precipitation of the peroxide stabilizer naturally leads to a reduction of the bleaching action, since the peroxide is no longer stabilized and consequently decomposes too rapidly. It is only in extremely long liquors of low concentration, e.g. in dyebecks, that such precipitation does not occur.

It is an object of the invention to obviate these drawbacks and to achieve stabilization of peroxide bleach liquors of both low and high concentration.

We have found a way of stabilizing alkaline peroxide bleach liquors containing silicates and peroxide stabilizers having a content of alkaline earth metals, which comprises adding to the liquors at least one quaternary ammonium salt of the formula

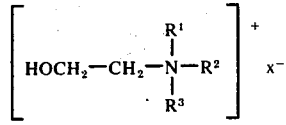

in which $R^1$, $R^2$ and $R^3$ may be the same or different and individually denote methyl or $\beta$-hydroxyethyl and $x^-$ is a monovalent anion or one equivalent of a polyvalent anion which is inert to the peroxides under the bleaching conditions and which is soluble in water in the form of the above salt.

Surprisingly, these ammonium salts make it possible to stabilize even highly concentrated bleach liquors having very high pHs and concentrations of up to 60 g/l of peroxide stabilizer and 60 g/l of silicate for a number of days.

A modern alkaline peroxide bleach liquor generally contains hydrogen peroxide or some other inorganic peroxide compound such as sodium perborate, sodium perphosphate, sodium percarbonate or sodium persulfate and also sodium hydroxide, a peroxide stabilizer containing alkaline earth metal (i.e. magnesium and/or calcium), sodium silicate and possibly an organic surfactant or surfactant mixture which may also contain foam suppressors.

In the wet-in-wet method of impregnation, a peroxide bleach liquor will generally contain from 20 to 75 g/l of hydrogen peroxide or an equivalent amount of some other inorganic percompound, from 15 to 50 g/l of a sodium silicate solution (water glass) of 35° Be, from 10 to 50 g/l of sodium hydroxide, from 5 to 40 g/l of the peroxide stabilizer and possibly from 5 to 15 g/l of surfactant or surfactant mixture which may contain foam suppressors.

The ammonium salts proposed in the present invention are generally contained in the liquors in concentrations of from 10 to 50 and preferably from 15 to 45 g/l.

If, as sometimes occurs, impregnation is carried out by the dry-to-wet method, it will generally be necessary to use only from about one-fifth to one-sixth of the amounts stated. In such cases it is also possible for precipitation to occur, although more slowly, if the ammonium salts are omitted.

Ammonium salts of the above formula include methyl triethanol ammonium, dimethyl diethanol ammonium, trimethyl ethanol ammonium and tetraethanol ammonium salts or mixtures thereof, their activity increasing in the order trimethyl, dimethyl, monomethyl compound, whilst maximum activity is shown when using the tetraethanol ammonium salt, for which reason the methyl triethanol ammonium and/or tetraethanol ammonium salts are preferred. A remarkable point to mention in this context is the surprising fact that the choice of substituents on the quaternary nitrogen atom is highly restricted. Even the replacement of methyl by ethyl or of $\beta$-hydroxyethyl by $\beta$- or $\gamma$-hydroxypropyl will cause a considerable loss of activity.

Suitable counterions $x^-$ are basically all inorganic and organic ions provided they cause no water-insolubility and do not enter into redox reactions with the percompounds under the bleaching conditions. The requirement that they must not cause water-insolubility means that the water-solubility must remain adequate for practical purposes. Thus virtually only anions having very large hydrocarbon radicals and readily oxidizable anions such as sulfite and chlorite are unsuitable.

Examples of suitable ions are chloride, sulfate, nitrate, acetate, propionate, methosulfate, ethosulfate, benzene sulfonate, p-toluene sulfonate (tosylate), the preferred ions being chloride, methosulfate and tosylate, since methyl chloride, dimethyl sulfate and methyl tosylate are among the most readily available methylating agents and further double decomposition to the other salts is not necessary.

The peroxide stabilizers are generally composed of two ingredients. These are organic chelating agents such as trisodiumnitrilotriacetate, tetrasodium ethylenediamine tetraacetate, pentasodium diethylenetriamine pentaacetate and gluconic acid or citric acid (alone or in admixture with each other), these being used with generally a low molar excess of alkaline earth metal salts such as magnesium and calcium chloride.

It will be appreciated that some or all of the sodium hydroxide can be replaced by other alkalis such as $Na_2CO_3$ or even KOH, although this is of no further advantage.

The bleach liquors may, as stated above, contain surfactants or surfactant mixtures. These may be anionic surfactants such as alkane sulfonates of from 8 to 22 carbon atoms, fatty alkyl sulfates which may contain a number of ethoxy groups (ether sulfates), $C_{8-12}$ alkylbenzene sulfonates, nonionic surfactants such as oxo alcohol and Ziegler alcohol ethoxylates, i.e. mainly those of from 9 to 20 carbon atoms and having from 3 to 20 oxyethyl groups, $C_{8-12}$ alkyl phenol ethoxylates having from 7 to 20 oxyethyl groups and mixtures thereof. Mixtures of anionic and nonionic surfactants which contain small amounts of a foam suppressor such as tri-n-butyl phosphate are preferred.

The alkaline peroxide bleach is carried out by known methods. For the purposes of the invention, the ammonium salts are mainly used in short liquor bleaching. In pad-roll bleaching or J-box bleaching, high-temperature bleaching or pad-batch bleaching the liquor ratio selected is from 1:1 to 2:1, the concentrations of the liquors being 5 to 6 times greater in the case of wet-in-wet impregnation to reach the values given above.

The concentrations and bleaching periods are governed by the temperature. Thus liquors for high-temperature processes carried out at from 110° to 150° C (pressure steamer) have concentrations which are near the lower limit of the above range of concentrations and such bleaching processes take only a few minutes. The other extreme, the pad-batch process, demands maximum concentrations and bleaching periods of more than 10 hours, frequently more than 24 hours. This always takes place at room temperature. The pad-roll process has concentrations in the middle of the range and takes from 30 minutes to 3 hours at temperatures of from 80° to 100° C.

Liquors containing the ammonium salts to be used in the present invention are stable against precipitation for many days. The fabrics bleached therewith are free from deposits and, on account of the increased stability of the peroxides, frequently show improved whiteness, particularly those which have been bleached by the pad-batch process.

EXAMPLES

The liquors are first mixed at one-fifth of the concentration given. The concentration is subsequently made up to the value given.

EXAMPLE 1

Bleaching in a J-box is carried out using the following liquor (wet-in-wet impregnation):
100 ml/l of 35 percent hydrogen peroxide
50 m/l of sodium silicate solution 38° Be
15 g/l of sodium hydroxide
10 g/l of a mixture of 80 percent of $C_{15}$ alkyl sulfonate (sodium salt), 18 percent of nonyl phenol ethoxylated with 8 moles of ethylene oxide and 2 percent of triisobutyl phosphate
25 g/l of a mixture of sodium EDTA (sodium ethylene diamine tetraacetate) and $MgCl_3$
20 g/l of triethanolamine methylammonium methosulfate.

The liquor remains stable for more than 24 hours. On omission of the ammonium compound, precipitation occurred after about one hour and the treated fabric showed silicate deposits after bleaching for 2 hours.

EXAMPLE 2

The following liquor was used in a pad-batch bleaching process:
200 ml/l of 35 percent hydrogen peroxide
50 ml/l of sodium silicate 38°Be
10 g/l of surfactant mixture as used in Example 1
50 g/l of peroxide stabilizer as used in Example 1
50 g/l of sodium hydroxide
25 g/l of tetraethanolammonium tosylate.

The fabric impregnated with this liquor showed no deposits, but without the ammonium compound it was hard and, on account of the over-rapid peroxide action, showed a lower degree of whiteness.

I claim:
1. In an alkaline aqueous peroxide bleach liquor containing (a) silicate and (b) peroxide stabilizers having a content of alkaline earth metals, the improvement consisting in that it contains about 10 to 50 g/l of at least one quaternary ammonium salt of the formula

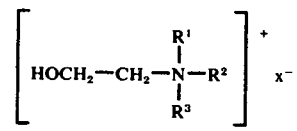

in which $R^1, R^2$ and $R^3$ are the same or different and individually denote methyl or $\beta$-hydroxyethyl and $x^-$ denotes a monovalent anion or one equivalent of a polyvalent anion which is inert to the peroxides under the bleaching conditions and is water-soluble in the form of the above salt.

2. An improved peroxide bleach liquor as claimed in claim 1 and containing, as ammonium salt, methyltriethanolammonium methosulfate, chloride or tosylate or the corresponding tetraethanolammonium salt or mixtures thereof.